(12) United States Patent
Sugiyama

(10) Patent No.: US 9,395,794 B2
(45) Date of Patent: Jul. 19, 2016

(54) REMOTE CONTROLLER

(71) Applicant: DENSO WAVE INCORPORATED, Chita-gun, Aichi-pref. (JP)

(72) Inventor: Wataru Sugiyama, Anjo (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 140 days.

(21) Appl. No.: 14/218,140

(22) Filed: Mar. 18, 2014

(65) Prior Publication Data

US 2015/0077401 A1 Mar. 19, 2015

(30) Foreign Application Priority Data

Sep. 19, 2013 (JP) .................................. 2013-193769

(51) Int. Cl.
| | | |
|---|---|---|
| *G05B 11/01* | (2006.01) | |
| *G06F 1/32* | (2006.01) | |
| *G06F 3/043* | (2006.01) | |

(52) U.S. Cl.
CPC ............ *G06F 1/3231* (2013.01); *G06F 1/3203* (2013.01); *G06F 3/043* (2013.01); *Y02B 60/1289* (2013.01)

(58) Field of Classification Search
CPC ............. G06F 3/01; G06F 3/02; G06F 3/011; G06F 3/014; G06F 3/016; G06F 3/041; G06F 3/043; G06F 3/044; G06F 3/0317; G06F 3/0338; G06F 3/0416; G06F 3/0481; G06F 3/03547
USPC .......................... 340/12.22; 345/161, 173, 177
See application file for complete search history.

(56) References Cited

U.S. PATENT DOCUMENTS

| | | | | |
|---|---|---|---|---|
| 8,502,774 | B2* | 8/2013 | Yamamoto .............. | G06F 3/038 345/157 |
| 2005/0078093 | A1* | 4/2005 | Peterson .................. | G06F 3/043 345/173 |
| 2006/0152497 | A1* | 7/2006 | Rekimoto ............. | G06F 1/1616 345/173 |
| 2010/0283751 | A1* | 11/2010 | Yabuuchi ................ | G06F 3/044 345/173 |
| 2011/0053653 | A1* | 3/2011 | Tho ...................... | H04M 1/0202 455/566 |
| 2011/0080367 | A1* | 4/2011 | Marchand ............. | G06F 1/3215 345/174 |
| 2011/0090150 | A1* | 4/2011 | Kawano .............. | G06F 3/03547 345/161 |
| 2011/0109574 | A1* | 5/2011 | Cipriano ............... | G06F 1/3203 345/173 |
| 2011/0291929 | A1* | 12/2011 | Yamada .................. | A63F 13/04 345/158 |

(Continued)

FOREIGN PATENT DOCUMENTS

| | | |
|---|---|---|
| JP | A-2005-348333 | 12/2005 |
| JP | 2011014384 A * | 1/2011 |

*Primary Examiner* — John A Tweel, Jr.
*Assistant Examiner* — Adnan Aziz
(74) *Attorney, Agent, or Firm* — Oliff PLC

(57) ABSTRACT

A remote controller includes a case. An operation input unit is disposed on an outer surface of a case, and receives an operation input for controlling a control subject. A control unit transmits a control signal for controlling the control subject. A substrate is disposed within the case, and comes into contact with the operation input unit when the operation input is received. A sensor is disposed on the substrate, detects vibration of the substrate caused by contact with the operation input unit, and outputs a detection signal indicating detection of the vibration. A contact detecting unit identifies whether or not the operation input is performed based on the detection signal. A power supply control unit controls power supplied to the control unit such as to increase the power when identified that the operation input is performed compared to the power when identified that the operation input is not performed.

16 Claims, 12 Drawing Sheets

(56) References Cited

U.S. PATENT DOCUMENTS

| | | | |
|---|---|---|---|
| 2013/0342505 A1* | 12/2013 | Miyazaki | G06F 3/0416 345/174 |
| 2014/0176318 A1* | 6/2014 | Kono | G06F 3/016 340/407.2 |
| 2014/0232677 A1* | 8/2014 | Yamane | G06F 3/041 345/173 |

* cited by examiner

FIG.1
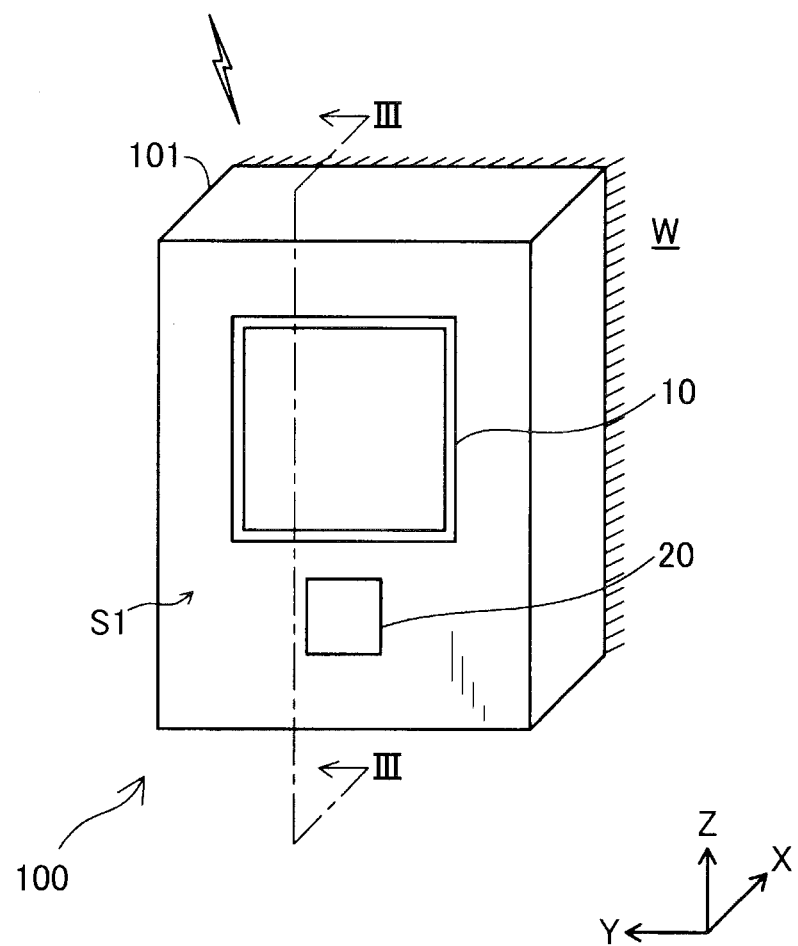

SECOND EMBODIMENT

SECOND EMBODIMENT

THIRD EMBODIMENT

THIRD EMBODIMENT

FOURTH EMBODIMENT

FOURTH EMBODIMENT

REMOTE CONTROLLER

CROSS-REFERENCE TO RELATED APPLICATION

This application is based on and claims the benefit of priority from Japanese Patent Application No. 2013-193769, filed Sep. 19, 2013, the disclosure of which is incorporated herein in its entirety by reference.

BACKGROUND

1. Technical Field

The present invention relates to a remote controller that remotely controls objects such as air-conditioning apparatuses.

2. Related Art

Remote controllers are used to remotely control objects to be controlled, such as air-conditioning apparatuses, television receivers, and main interphone units. To reduce power consumption while the remote controller is in an input standby state, a following technology has been proposed (refer to JP-A-2005-348333). In this technology, a latching relay enters a startup state when a user presses an operating button on the remote controller. Up to this point, power supply to each circuit in the remote controller is stopped. However, when the operating button is pressed and the latching relay enters the startup state, power supply to each circuit is started. In addition, due to recent demands for improved design, compactness, reduced manufacturing costs, and the like, a capacitance-type touch panel or the like is sometimes used as an operation input section of the remote controller.

In a configuration in which the operation input section of the remote controller is configured by a touch panel as described above, and the remote controller is in a low power consumption state until the user makes contact with (touches) the operation input section, power is supplied at all times to a circuit that detects the contact made on the operation input section.

In a configuration such as this, to improve detection accuracy of the contact made on the operation input section, a sensor may be used as the circuit that detects the contact. This sensor consumes a significant amount of power due to high sensitivity (measurement resolution). However, in this instance, a problem occurs in that power consumption during the standby state of the remote controller increases.

This problem is also common to a configuration in which the operation input section is configured by an operating button. In addition, in conventional remote controllers, reduced size of the remote controller, reduced costs, improved reliability, resource conservation, easier manufacturing, improved usability, and the like are desired.

SUMMARY

The present disclosure has been achieved to solve at least some of the above-described issues. The present disclosure can be actualized by the following embodiments.

(1) An exemplary embodiment provides a remote controller. The remote controller includes a case, an operation input unit, a control unit, a substrate, a sensor, a contact detecting unit, and a power supply control unit. The operation input unit is disposed on an outer surface of the case and receives an operation input for controlling a control subject. The control unit transmits, to the control subject, a control signal for controlling the control subject based on the operation input received by the operation input unit. The substrate is disposed within the case and, when the operation input unit receives the operation input, comes into contact with the operation input unit. The sensor is disposed on the substrate, detects vibration of the substrate caused by contact with the operation input unit, and outputs a detection signal indicating the detection of the vibration. The contact detecting unit identifies whether or not the operation input is performed based on the detection signal. The power supply control unit controls power supplied to the control unit such as to increase the power when identified that the operation input is performed compared to the power when identified that the operation input is not performed.

In the remote controller according to the embodiment, the sensor that detects the vibration of the substrate and transmits a detection signal to the contact detecting unit is disposed on the substrate. The substrate comes into contact with the operation input unit when the operation input is received. Therefore, impact generated when the operation input is performed can be detected as a vibration of the substrate. Therefore, even when a sensor having low power consumption due to low sensitivity (measurement resolution) is used, or even when the sensor is operated in an operating mode in which power consumption is low due to low sensitivity, the operation input can be accurately detected. As a result, detection accuracy of the operation input to the operation input unit can be improved while suppressing increase in power consumption of the remote controller.

(2) In the remote controller according to the above-described embodiment, a supporting section may be further provided that comes into contact with the substrate. A contact section of the substrate that comes into contact with the supporting section may serve as a fulcrum when the substrate vibrates. The sensor may be disposed in a position on the substrate differing from the position of the contact section. In the remote controller according to the embodiment, the sensor is disposed in a position differing from the position of the contact section that serves as the fulcrum when the substrate vibrates. Therefore, compared to a configuration in which the sensor is disposed in the same position as the contact section, the sensor can detect a stronger vibration.

(3) In the remote controller according to the above-described embodiment, the contact section may be disposed in a corresponding position on the substrate. The corresponding position corresponds to the operation input section in an operation input direction. In the remote controller according to the embodiment, the contact section is disposed in the position corresponding to the operation input unit in the operation input unit. Therefore, the impact of the operation input can be firmly transmitted to the substrate.

(4) In the remote controller according to the above-described embodiment, between the contact section and an edge portion of the substrate, the sensor may be disposed on the edge portion side of the substrate. In the remote controller according to the embodiment, between the contact section and the edge portion of the substrate, the sensor is disposed on the edge portion side that vibrates more strongly than the contact section side. Therefore, the sensor can detect a stronger vibration.

(5) In the remote controller according to the above-described embodiment, the operation input unit may have a plurality of sub operation input units that are disposed away from each other. The corresponding position may be a position on the substrate corresponding in the input direction to a position at the center between the plurality of sub operation input units. In the remote controller according to the embodiment, the contact section is positioned in the position corresponding in the input direction to the position at the center between the plurality of sub operation input units. Therefore, regardless of which sub operation input unit receives the operation input, the impact of the input can be firmly transmitted to the substrate.

(6) In the remote controller according to the above-described embodiment, the case may have a rib in the edge portion thereof. The supporting section may be configured as a part of the rib. Portions of the rib other than the supporting section may not be in contact with the substrate in a state in which the operation input unit is not receiving the operation input. In the remote controller according to the embodiment, a member separate from the case is not required to be provided as the supporting section. Therefore, size reduction and manufacturing cost reduction of the remote controller can be actualized.

(7) In the remote controller according to the above-described embodiment, an attaching section may be further provided for attaching the remote controller to a surface on which an attachment fixture is mounted. In addition, a projecting section may be further provided that is disposed on an opposing surface of the case that opposes the surface in a state in which the remote controller is attached to the surface, and comes into contact with the surface when the operation input unit receives the operation input. The attaching section may engage with the attachment fixture such that the remote controller is movable in the operation input direction. In the remote controller according to the embodiment, when the operation input unit receives the operation input, the remote controller comes into contact with the surface at the projecting section and is movable in the input direction. Therefore, when the operation input unit receives the operation input, the overall remote controller can be vibrated (rocked) by the impact of the input. As a result, the sensor can detect a stronger vibration.

(8) In the remote controller according to the above-described embodiment, the operation input unit may have a touch panel. In the remote controller according to the embodiment, the operation input unit has a touch panel. Therefore, the design of the remote controller can be improved. In addition, size reduction and manufacturing cost reduction of the remote controller can be actualized.

(9) In the remote controller according to the above-described embodiment, a battery may be further provided that supplies power. In the remote controller according to the present embodiment, power consumption of the remote controller in power saving mode can be suppressed. Therefore, battery replacement frequency or battery recharging frequency can be reduced.

The present exemplary embodiment can be actualized by various embodiments. For example, the present invention can be actualized by embodiments such as a remote control system, a method for manufacturing a remote controller, and a method for detecting operation input to an operation input unit.

BRIEF DESCRIPTION OF THE DRAWINGS

In the accompanying drawings:

FIG. 1 is an explanatory diagram of an outer appearance configuration of a remote controller according to a first embodiment of the present invention;

DESCRIPTION OF THE EMBODIMENTS

A. First Embodiment

A1. Device Configuration

Figure 2:
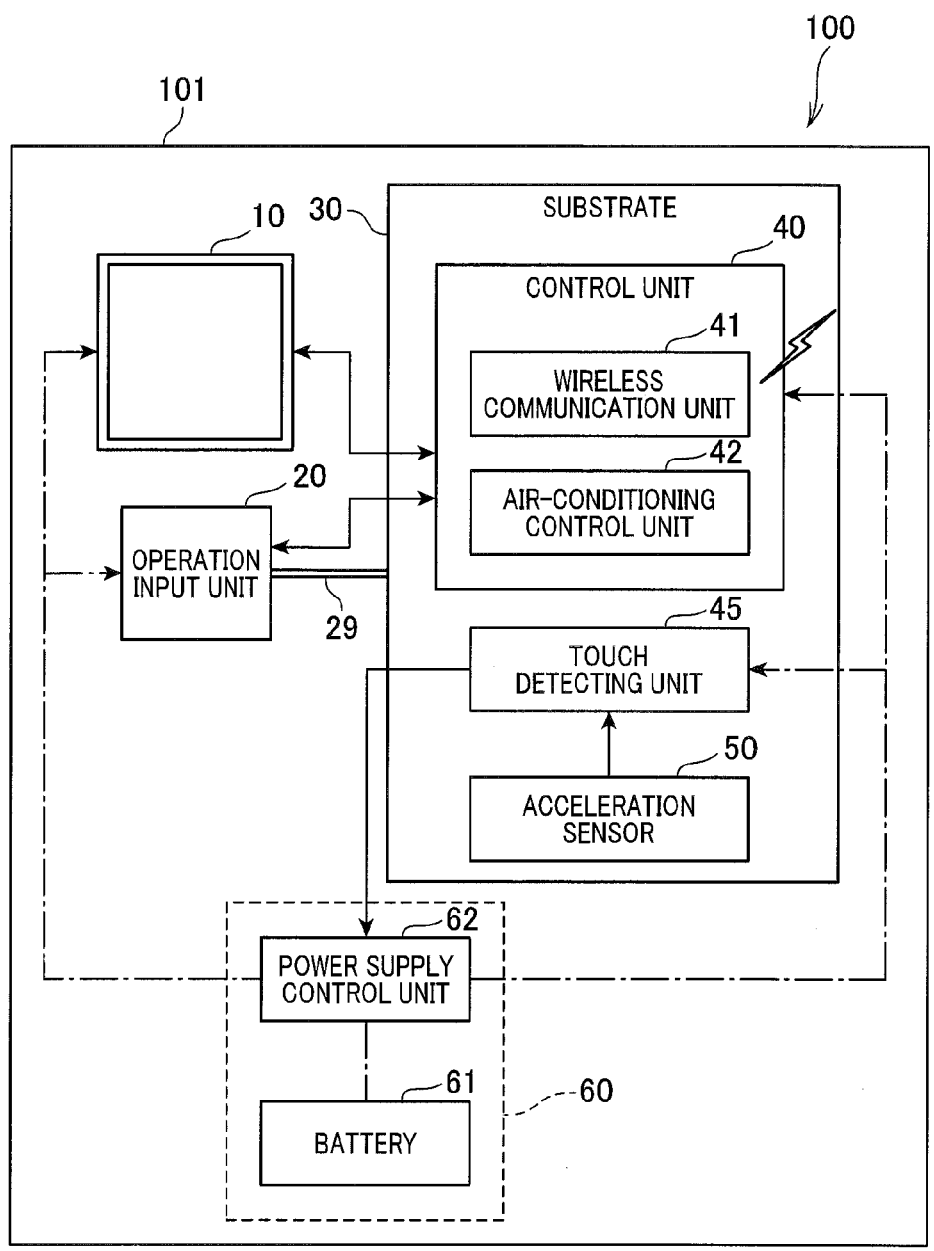
FIG. 2 is a block diagram of a configuration of a remote controller shown in FIG. 1.

FIG. 1 is an explanatory diagram of an outer appearance configuration of a remote controller according to a first embodiment of the present invention. A remote controller 100 is mounted on a wall surface W that is parallel to a vertical direction. The remote controller 100 remotely controls an air-conditioning apparatus 200. The remote controller 100 includes a case 101, a display unit 10, and an operation input unit 20. In FIG. 1, a +Z direction is equivalent to a vertically upward direction. A Y-axis direction is a direction that is parallel to the wall surface W. An X-axis direction is a direction perpendicular to the wall surface W. Hereafter, a Z-axis direction collectively refers to the +Z direction and a −Z direction. In a similar manner, the X-axis direction collectively refers to a +X direction and a −X direction. The Y-axis direction collectively refers to a +Y direction and a −Y direction.

The case 101 has a substantially rectangular parallelepiped outer shape. The case 101 is made of a resin. The display unit 10 and the operation input unit 20 are exposed on a surface S1 of the case 101. The surface S1 is opposite to a surface of the case 101 that opposes the wall surface W. The display unit 10 is disposed substantially in the center of the surface S1. According to the first embodiment, the display unit 10 is composed of a liquid crystal panel. The display unit 10 displays the current state of the air-conditioning apparatus 200 (airflow quantity, operating mode, preset temperature, and the like). The display unit 10 also displays input details that have been inputted from the operation input unit 20.

The operation input unit 20 receives an input of an operation for controlling the air-conditioning apparatus 200. According to the present embodiment, the operation input unit 20 is disposed vertically below the display unit 10 on the surface S1. The operation input unit 20 is composed of a touch panel. According to the first embodiment, a capacitance-type touch panel is used as the touch panel that configures the operation input unit 20. Other types of touch panels, such as a resistive film type, a pressure-sensitive type, or an optical type, may be used instead of the capacitance type.

FIG. 2 is a block diagram of a configuration of the remote controller 100 shown in FIG. 1. As shown in FIG. 2, the remote controller 100 includes a substrate 30, a control unit 40, a touch detecting unit 45, an acceleration sensor 50, and a power supply unit 60, in addition to the above-described case 101, display unit 10, and operation input unit 20.

The substrate 30 is a thin plate-shaped member. Wiring is formed on the surface of the substrate 30. A contact transmitting section 29 is disposed between the substrate 30 and the operation input unit 20. The contact transmitting section 29 is a bar-shaped member composed of a resin. Impact (touch) generated when a user makes contact with the operation input unit 20 is transmitted to the substrate 30. In other words, the substrate 30 comes into contact with the operation input unit 20 with the contact transmitting section 29 therebetween.

The control unit 40 is disposed on the substrate 30. The control unit 40 is electrically connected to the display unit 10 and the operation input unit 20. The control unit 40 includes a wireless communication unit 41 and an air-conditioning control unit 42.

The wireless communication unit 41 includes an antenna and various circuits for performing wireless communication with the air-conditioning device 200. According to the first embodiment, infrared communication is used for communication between the wireless communication unit 41 and the air-conditioning apparatus 200. Short-range wireless communication, such as Bluetooth (registered trademark), or various kinds of wireless local area network (LAN) communication prescribed by IEEE802.11 may be used instead of infrared communication.

An air-conditioning control unit 42 transmits control commands to the air-conditioning apparatus 200, via the wireless communication unit 41. The control commands give instructions regarding airflow quantity, airflow direction, temperature, and the like. The air-conditioning unit 42 transmits the control commands based on operation details inputted from the operation input unit 20. In addition, the air-conditioning control unit 42 receives information indicating the state of the air-conditioning apparatus 200 and transmitted from the air-conditioning apparatus 200, via the wireless communication unit 41. The air-conditioning control unit 42 is configured by a microprocessor, a memory, and the like (not shown) provided on the substrate 30. The air-conditioning control unit 42 may be configured by various types of circuits.

A touch detecting unit 45 is disposed on the substrate 30. The touch detecting unit 45 is configured by various types of circuits. The touch detecting unit 45 is electrically connected to the acceleration sensor 50. The touch detecting unit 45 receives a signal indicating acceleration from the acceleration sensor 50. Based on the received signal, the touch detecting unit 45 identifies (detects) whether or not an operation input to the operation input unit 20 is performed (touched by the user). Specifically, the touch detecting unit 45 identifies that an operation input to the operation input unit 20 is performed when the acceleration indicated by the signal received from the acceleration sensor 50 is a predetermined threshold or higher. The touch detecting unit 45 then detects the input. In addition, the touch detecting unit 45 is electrically connected to the power supply unit 60. When the operation input to the operation input unit 20 is detected, the touch detecting unit 45 transmits a detection signal to the power supply unit 60.

The acceleration sensor 50 is disposed on the substrate 30. The acceleration sensor 50 detects the acceleration of the substrate 30 and notifies the touch detecting unit 45 of the detected acceleration. As described hereafter, the substrate 30 vibrates when an operation input to the operation input unit 20 is performed. Therefore, the acceleration sensor 50 detects a value higher than 0 m/s$^2$ as the acceleration of the substrate 30. The acceleration sensor 50 then notifies the touch detecting unit 45 of the acceleration.

The predetermined threshold used by the above-described touch detecting unit 45 to detect the operation input can be set as follows. For example, the maximum value of acceleration of the substrate 30 during an input standby state can be measured in advance by experiments. The predetermined threshold can then be set to a value higher than the experimentally-measured maximum value. The acceleration of the substrate 30 in the input standby state includes, for example, vibrations caused by air striking the case 101 and acceleration attributed to vibrations from the wall surface W.

The power supply unit 60 includes a battery 60 and a power supply control unit 62. The battery 61 supplies power to each functional unit of the remote controller 100. According to the first embodiment, the battery 61 is a dry cell. However, a primary battery or secondary battery of other arbitrary types may be used instead of the dry cell.

The power supply control unit 62 is electrically connected to the display unit 10, the operation input unit 20, the control unit 40, and the touch detecting unit 45. The power supply control unit 62 controls power supply to each of these functional units. Specifically, when an operation input to the operation input unit 20 is performed, the power supply control unit 62 supplies power to the display unit 10, the operation input unit 20, the control unit 40, and the touch detecting unit 45.

An operating mode in which the display unit 10, the operation input unit 20, the control unit 40, and the touch detecting unit 45 are each supplied power in this way is referred to, hereinafter, as "normal mode". Conversely, when an operation input to the operation input unit 20 is not performed for a certain amount of time, the power supply control unit 62 supplies power only to the touch detecting unit 45. An operating mode in which only the touch detecting unit 45 is supplied power in this way is referred to, hereinafter, as "power saving mode".

In power saving mode, power is supplied only to the touch detecting unit 45. Therefore, compared to normal mode, the amount of power supplied to the control unit 40 is low. In addition, power consumption by the control unit 40 during power saving mode is lower than power consumption by the control unit 40 during normal mode. A process for switching the operating mode between normal mode and power saving mode, described above, will be described in detail hereafter.

Figure 3:
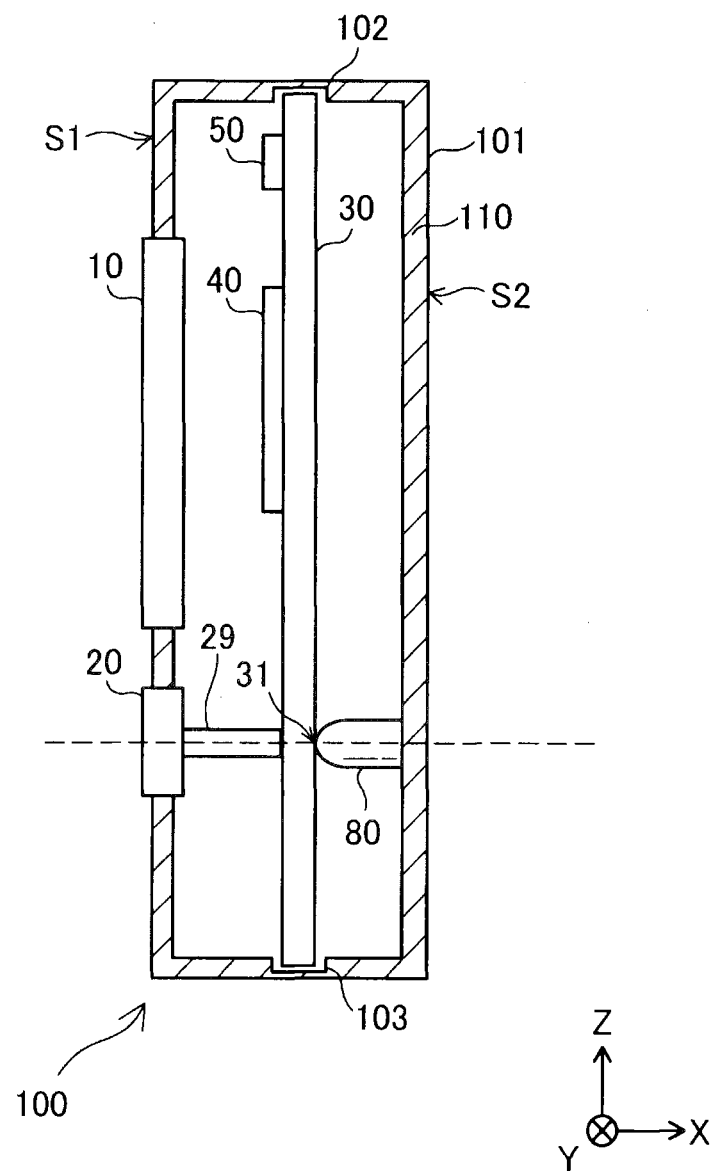
FIG. 3 is a cross-sectional view of the remote controller shown in FIG. 1, taken along line III-III.

FIG. 3 is a cross-sectional view of the remote controller 100 in FIG. 1, taken along line III-III. As shown in FIG. 3, a rib 110 is formed on the edge portion of the case 101. In the rib 110, an engaging groove 102 is formed in a portion corresponding to the ceiling of the case 101. The engaging groove 102 extends in a direction along the Y axis. In a similar manner, an engaging groove 103 is formed in a portion corresponding to the bottom of the case 101. The engaging groove 103 extends in the direction along the Y axis.

The engaging groove 102 and the engaging groove 103 are disposed in positions that correspond to each other in the Z-axis direction. The engaging groove 102 and the engaging groove 103 engage with edge portions of the substrate 30. Here, the width (length in the X-axis direction) of the engaging groove 102 and the engaging groove 103 is wider than the thickness (length in the X-axis direction) of the substrate 30. Therefore, the engaging groove 102 and the engaging groove 103 engage with the substrate 30 such that the substrate 30 is movable in the X-axis direction.

As shown in FIG. 3, one end portion of the contact transmitting section 29 is joined to a center portion of the inner surface of the operation input unit 20. An end portion of the contact transmitting section 29 on the side opposite to the end portion that is joined to the operation input unit 20 is in contact with the substrate 30. The contact transmitting section 29 is disposed such that the center axis thereof is parallel with the X-axis direction.

A supporting section 80 is disposed on the inner side of an end surface of the case 101 in the +X direction (in other words, a surface S2 that opposes the wall surface W). The supporting section 80 is a bar-shaped member that has elasticity. According to the first embodiment, the supporting section 80 is composed of rubber. An arbitrary rubber, such as silicone rubber, butadiene rubber, or fluororubber, can be used as the rubber. In addition, the supporting section 80 may be configured by a resin that has elasticity, instead of rubber.

One end portion of the supporting section 80 is joined to the rib 110. The other end portion of the supporting section 80 has a semi-spherical outer appearance configuration. A peak portion of the other end portion is in contact with the substrate 30. The supporting section 80 is disposed such that the center axis thereof is parallel with the X-axis direction. As shown in FIG. 3, the supporting section 80 is disposed such that the center axis of the supporting section 80 and the center axis of the contact transmitting section 29 match.

The operation input unit 20, the contact transmitting section 29, and the supporting section 80 have the positional relationship described above. Therefore, a contact section 31 of the substrate 30 that is in contact with the supporting section 80 is disposed in a position corresponding in the X-axis direction to the center portion of the operation input unit 20 on the substrate 30.

As shown in FIG. 3, the control unit 40 is disposed substantially in the center of the substrate 30 in the Z-axis direction (more specifically, slightly above the center). The acceleration sensor 50 is disposed near the edge portion of the substrate 30 in the +Z direction (vertically upward direction).

Figure 4:
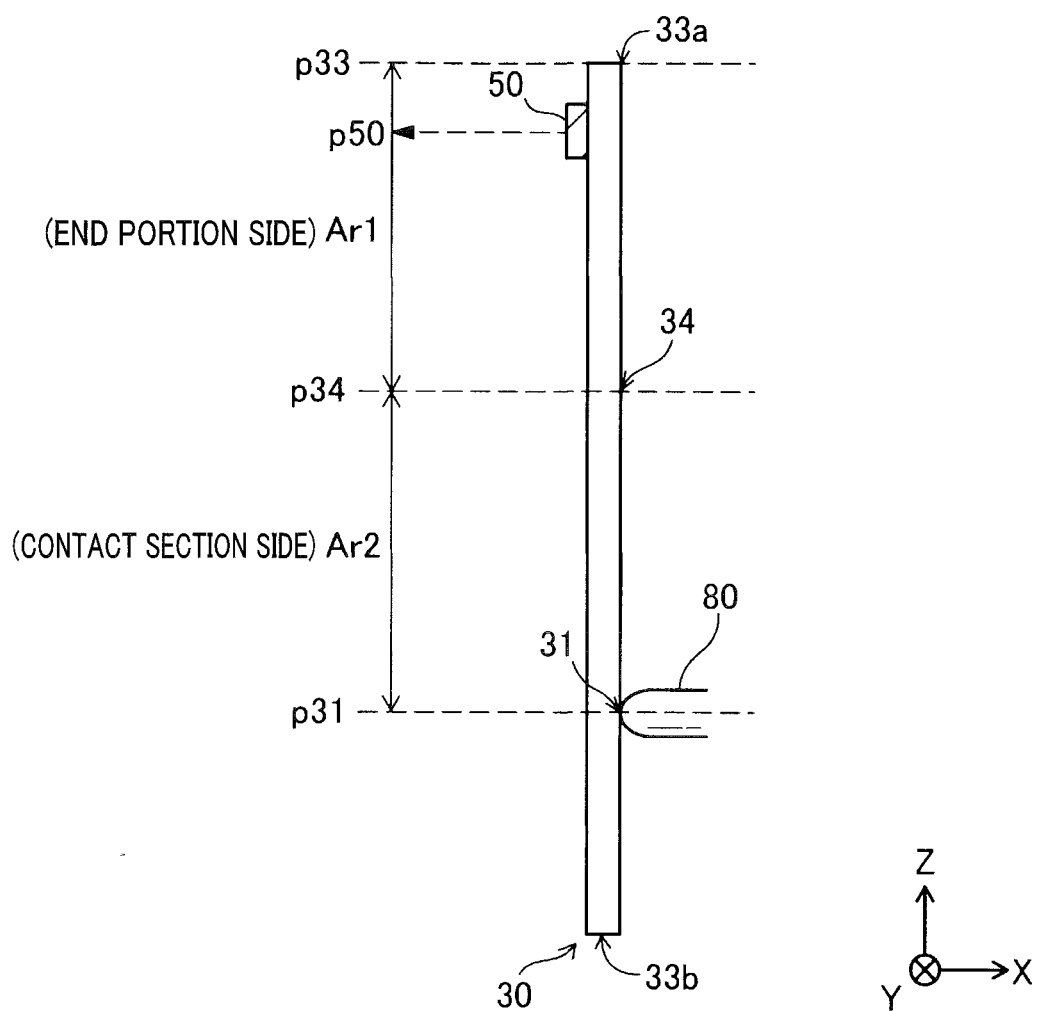
FIG. 4 is an explanatory diagram for explaining a placement position of an acceleration sensor on a substrate in the remote controller shown in FIG. 3

FIG. 4 is an explanatory diagram for explaining the placement position of the acceleration sensor 50 on the substrate 30. In FIG. 4, only the substrate 30, the acceleration sensor 50, and the supporting section 80, among the constituent elements shown in FIG. 3, are shown for convenience of explanation.

As shown in FIG. 4, between a position p31 of the contact section 31 in the Z-axis direction and a position p33 of an edge portion 33a of the substrate 30 in the Z-axis direction, a position p50 of the acceleration sensor 50 in the Z-axis direction is on the position p33 side (closer to the position p33).

The position p50 of the acceleration sensor 50 being on the position p33 side (closer to the position p33) indicates that the acceleration sensor 50 is disposed in an area Ar1 between a position p34 and the position p33 of the edge portion 33a. The position 34 is along the Z-axis direction of a center portion 34 along the Z-axis direction between the contact section 31 and the edge portion 33a. In other words, the position p50 of the acceleration sensor 50 is not disposed in an area Ar2 between the position p34 of the center portion 34 and the position p33 of the edge portion 33a on the vertically downward side.

The above-described acceleration sensor 50 is equivalent to a sensor in the claims. In addition, the touch detecting unit 45 is equivalent to a contact detecting unit in the claims.

A2. Operation Mode Switching Process

Figure 5:
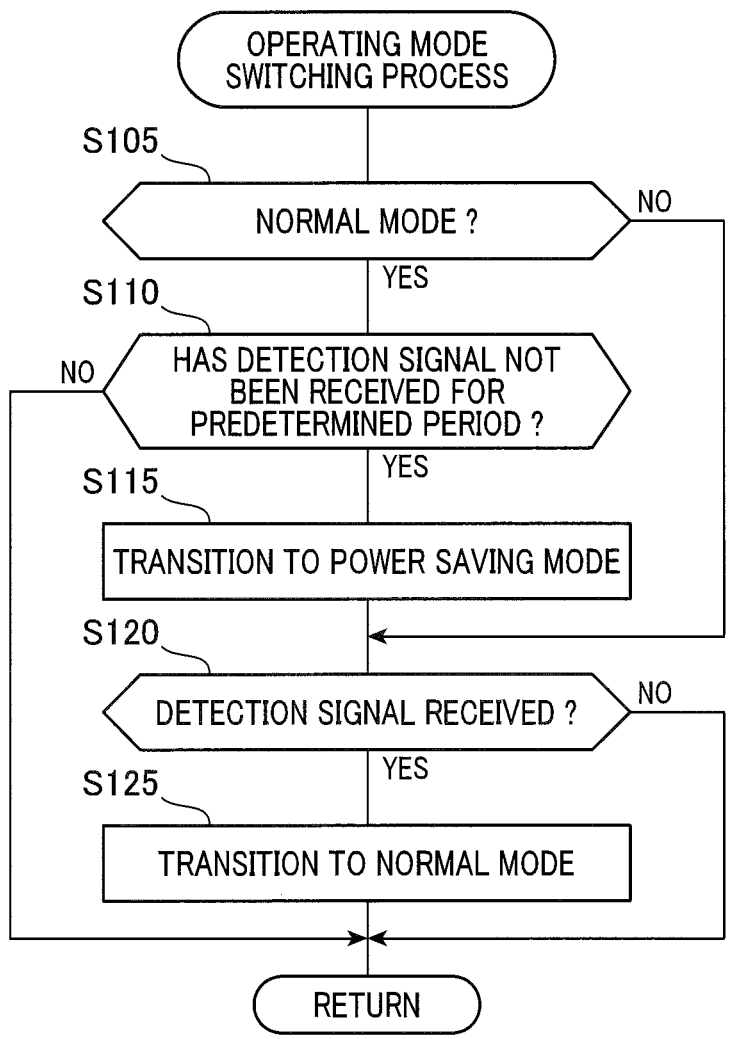
FIG. 5 is a flowchart of the procedures in an operating mode switching process performed by the remote controller shown in FIG. 1.

FIG. 5 is a flowchart of the procedures in an operation mode switching process performed by the remote controller 100. The operation mode switching process is performed when power supply from the battery 61 becomes possible.

The power supply control unit 62 judges whether or not the current operating mode is normal mode (step S105). When judged that the current operating mode is normal mode (YES at step S105), the power supply control unit 62 judges whether or not a detection signal has not been received from the touch detecting unit 45 for a predetermined period or longer (step S110).

When the predetermined period has not elapsed from the reception of the last detection signal (NO at step S110), the power supply control unit 62 returns to above-described step S105. On the other hand, when judged that a detection signal has not been received for the predetermined period or longer (YES at step S110), the power supply control unit 62 transitions to power saving mode and supplies power only to the touch detecting unit 45 (step S115). The power supply control unit 62 judges whether or not a detection signal is received from the touch detecting unit 45 (step S120).

When judged that the detection signal is received (YES at step S120), the power supply control unit 62 transitions to normal mode and supplies power to the display unit 10, the operation input unit 20, the control unit 40, and the touch detecting unit 45.

When judged at above-described step S105 that the operating mode is not normal mode (in other words, power saving mode) (NO at step S105), the power supply control unit 62 proceeds to above-described Step S120. In addition, when judged at above-described step S120 that a detection signal is not received (NO at step S120), the power supply control unit 62 returns to above-described step S105.

A3. Operation During Operation Input (Touch)

Figure 6:
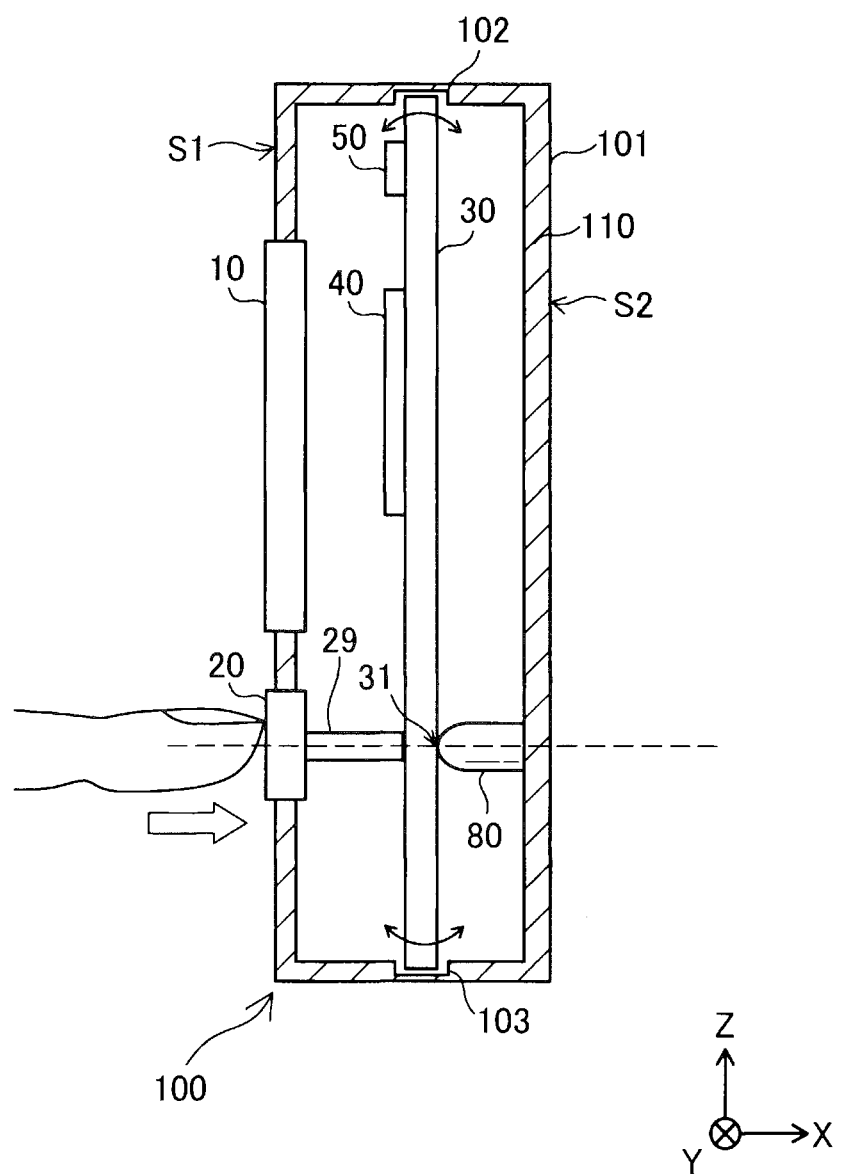
FIG. 6 is an explanatory diagram of an operation of the remote controller performed when an operation input unit receives an operation input.

FIG. 6 is an explanatory diagram of an operation of the remote controller 100 when the operation input unit 20 receives an operation input. As shown in FIG. 6, when the user touches the operation input unit 20, the impact of the contact is transmitted to the substrate 30 via the contact transmitting section 29.

As shown in FIG. 6, the direction of the touch by the user, or in other words, the operation input direction is the +X direction. As described above, the contact section 31 of the substrate 30 is disposed in a position corresponding in the X-axis direction to the center portion of the operation input unit 20 on the substrate 30. Therefore, when the impact of the contact is transmitted to the substrate 30, the contact section 31 receives stress from the supporting section 80. As a result, the impact of the contact on the operation input unit 20 is firmly transmitted to the substrate 30.

As described above, the substrate 30 is engaged with the engaging groove 102 and the engaging groove 103 such as to be movable in the X-axis direction. Therefore, when the impact of the contact on the operation input unit 20 is transmitted to the substrate 30, the substrate 30 rocks with the contact section 31 as a fulcrum (axis). The movement of the substrate 30 at this time is greater than that in a configuration in which the substrate 30 is firmly fixed to the case 101.

Therefore, the acceleration sensor 50 detects a greater acceleration. In particular, the acceleration sensor 50 is disposed near the edge portion. The edge portion rocks more strongly because the edge portion is far from the contact section 31. Therefore, the acceleration sensor 50 rocks strongly in accompaniment with the rocking of the substrate 30. As a result, the acceleration sensor 50 can detect an acceleration that is the predetermined threshold or higher.

In the remote controller 100 according to the first embodiment, described above, the acceleration sensor 50 is disposed on the substrate 30. The substrate 30 comes into contact with the operation input unit 20 when an operation input is received by the operation input unit 20. Therefore, the impact during operation input (touch) can be detected as a vibration in the substrate 30.

As a result, even when a sensor having low sensitivity (measurement resolution) and low power consumption is used as the sensor 50, or even when the sensor 50 has low sensitivity and operates in an operating mode in which power consumption is low, the operation input can be accurately detected. Therefore, detection accuracy of the contact on the operation input unit 20 can be improved while suppressing increase in power consumption of the remote controller 100.

In addition, the acceleration sensor 50 is disposed in a position differing from the contact section 31. Therefore, compared to a configuration in which the acceleration sensor 50 is disposed in the contact section 31, the acceleration sensor 50 rocks more strongly when the impact is transmitted to the substrate 30. As a result, detection accuracy of the contact on the operation input unit 20 can be further improved.

In addition, between the position p31 of the contact section 31 in the Z-axis direction and the position p33 of the edge portion 33a of the substrate 30 in the Z-axis direction, the position p50 of the acceleration sensor 50 in the Z-axis direction is on the position 33 side (in other words, the position p50 is in the area Ar1). Therefore, compared to a configuration in which the position p50 is on the position p31 side (in other words, in the area Ar2), the acceleration sensor 50 rocks more strongly when the impact is transmitted to the substrate 30. As a result, detection accuracy of the contact on the operation input unit 20 can be further improved.

In addition, the contact section 31 of the substrate 30 is disposed in a position that corresponds in the X-axis direction to the center portion of the operation input unit 20 on the substrate 30. Therefore, the impact of the contact on the operation input unit 20 can be firmly transmitted to the substrate 30.

B. Second Embodiment

Figure 7:
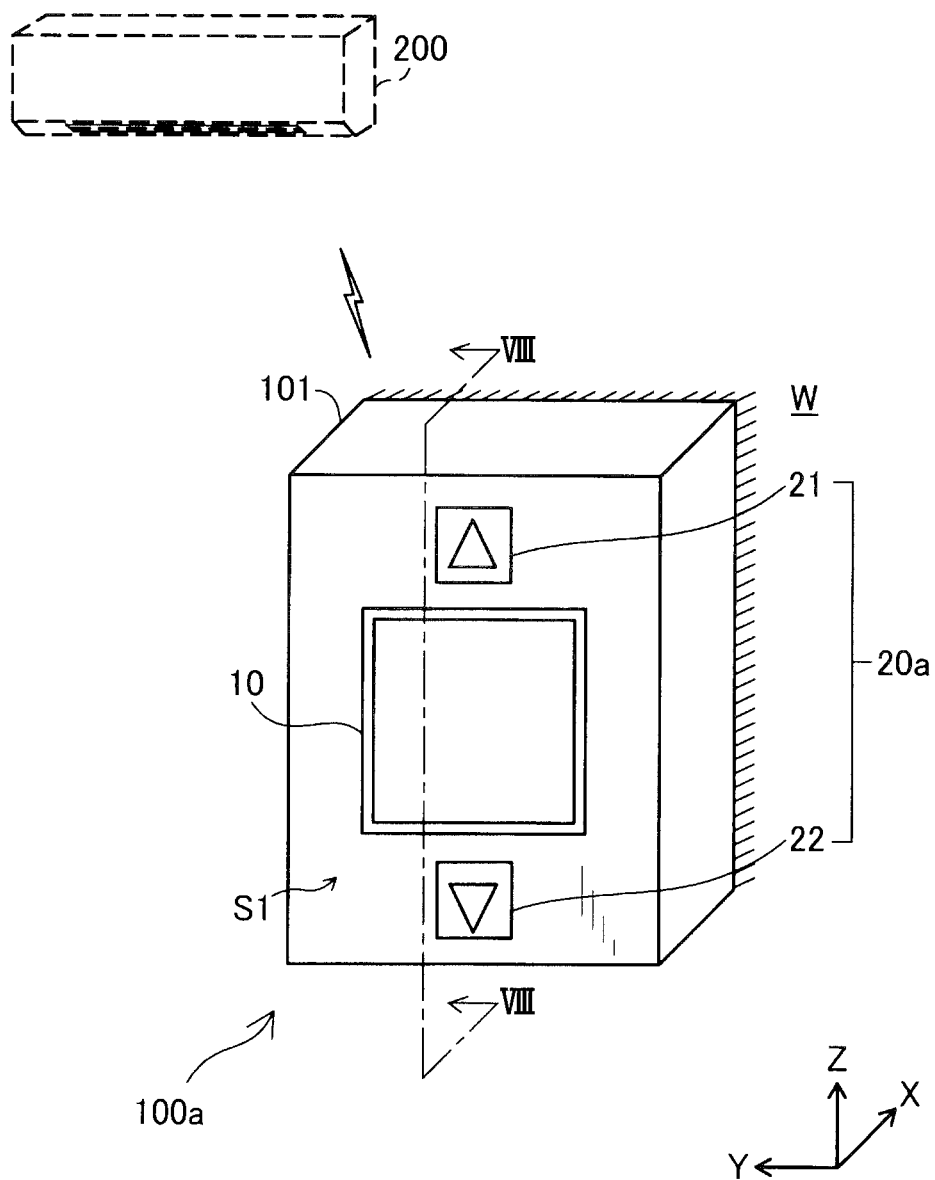
FIG. 7 is an explanatory diagram of an outer appearance configuration of a remote controller according to a second embodiment.

FIG. 7 is an explanatory diagram of an outer appearance configuration of a remote controller according to the second embodiment. A remote controller 100a according to the second embodiment differs from the remote controller 100 according to the first embodiment in that the remote controller 100a includes an operation input unit 20a instead of the operation input unit 20. In addition, the placement position of the supporting section 80 differs from that of the remote controller 100 according to the first embodiment. In the remote controller 100a according to the second embodiment, other configurations are the same as those of the remote controller 100 according to the first embodiment. Therefore, the same constituent elements are given the same reference numbers as those according to the first embodiment. Detailed descriptions thereof are omitted.

As shown in FIG. 7, the operation input unit 20a according to the second embodiment includes a first sub operation input section 21 and a second sub operation input section 22. The first sub operation input section 21 is disposed vertically above the display unit 10 on the surface S1. The second sub operation input section 22 is disposed vertically below the display unit 10 on the surface S1. The first sub operation input section 21 and the second sub operation input section 22 are configured in a manner similar to that of the operation input unit 20 according to the first embodiment. Therefore, detailed descriptions thereof are omitted.

For example, the first sub operation input section 21 is used to increase the preset temperature of the air-conditioning apparatus 200. The second sub operation input section 22 is used to decrease the preset temperature of the air-conditioning apparatus 200.

Figure 8:
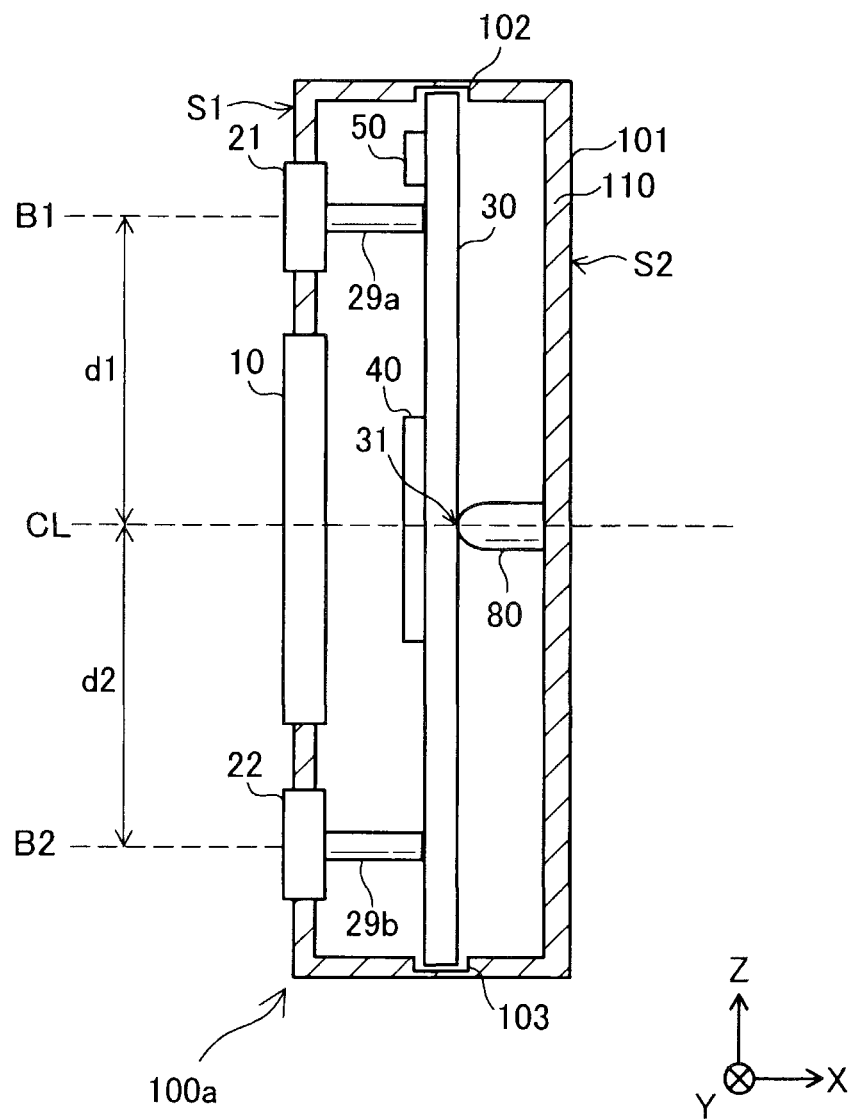
FIG. 8 is a cross-sectional view of the remote controller in FIG. 7, taken along line VIII-VIII.

FIG. 8 is a cross-sectional view of the remote controller 100a in FIG. 7, taken along line VIII-VIII. As shown in FIG. 8, a contact transmitting section 29a is disposed between the first sub operation input section 21 and the substrate 30. In addition, a contact transmitting section 29b is disposed between the second sub operation input section 22 and the substrate 30. The two contact transmitting sections 29a and 29b are configured in a manner similar to that of the contact transmitting section 29 according to the first embodiment. Therefore, detailed descriptions thereof are omitted.

As shown in FIG. 8, a position CL of the supporting section 80 in the Z-axis direction is equivalent to the center between a position B1 and a position B2. The position B1 is in the Z-axis direction of the center portion of the first sub operation input section 21. The position B2 is in the Z-axis direction of the center position of the second sub operation input section 22. Therefore, the contact section 31 that comes into contact with the supporting section 80 on the substrate 30 is disposed in a position corresponding in the X-axis direction to a position in the center between the first sub operation input section 21 and the second operation input section 22.

The remote controller 100a according to the second embodiment, configured as described above, achieves effects similar to those of the remote controller 100 according to the first embodiment. As is clear from the second embodiment and the first embodiment described above, the contact section 31 on the substrate 30 that is disposed in the position corresponding in the user touch direction to the operation input sections 20 and 20a can be used in the remote controller of the present disclosure. According to a third embodiment, a contact section 31a is equivalent to a contact section in the claims.

C. Third Embodiment

Figure 9:
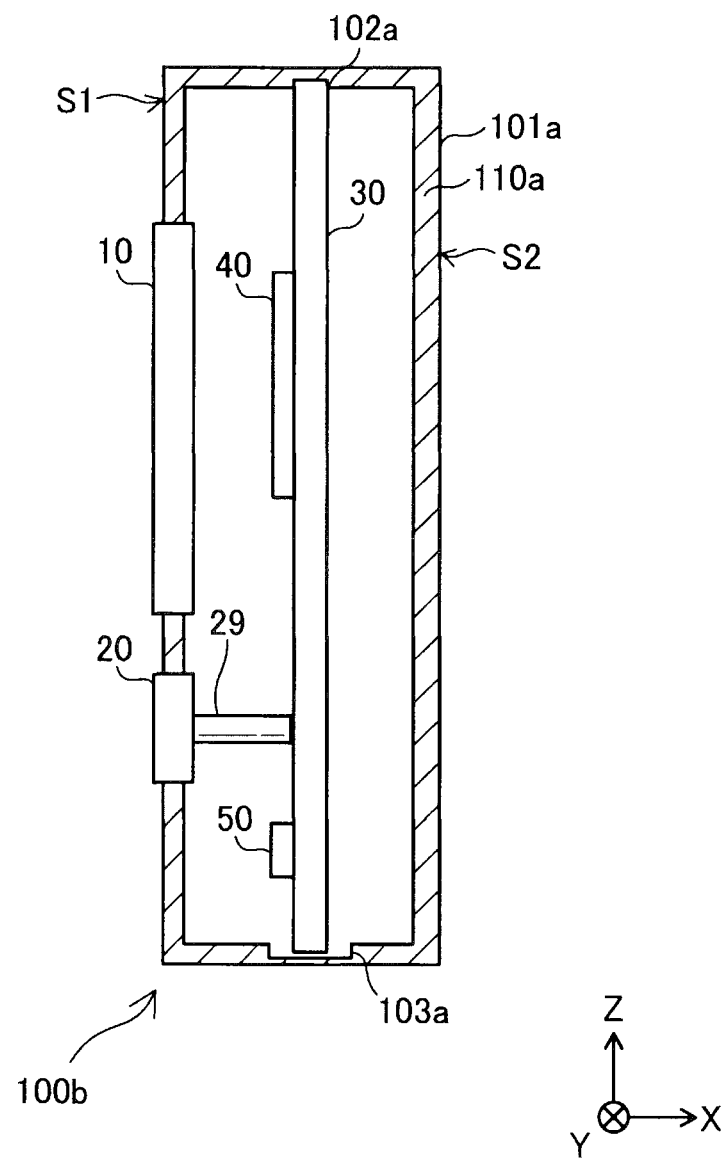
FIG. 9 is a cross-sectional view of a configuration of a remote controller according to a third embodiment.

FIG. 9 is a cross-sectional view of a configuration of a remote controller according to a third embodiment. FIG. 9 shows a cross-section of a remote controller 100b according to the third embodiment, taken along a position similar to that of the cross-section III-III in FIG. 1.

The remote controller 100b according to the third embodiment differs from the remote controller 100 according to the first embodiment in that the supporting section 80 is omitted, and a case 101a is included instead of the case 101. In addition, the placement position of the acceleration sensor 50 differs from that of the remote controller 100 according to the first embodiment. In the remote controller 100b according to the third embodiment, other configurations are the same as those of the remote controller 100 according to the first embodiment. Therefore, the same constituent elements are given the same reference numbers as those according to the first embodiment. Detailed descriptions thereof are omitted.

As shown in FIG. 9, the case 101a according to the third embodiment differs from the case 101 according to the first embodiment in that a rib 110a is provided instead of the rib 110. Other configurations are similar to those of the case 101 according to the first embodiment. The rib 110a differs from the rib 110 according to the first embodiment in that an engaging groove 102a is provided instead of the engaging groove 102, and an engaging groove 103a is provided instead of the engaging groove 103. Other configurations are similar to those of the rib 110 according to the first embodiment.

The width (length in the X-axis direction) of the engaging groove 102a according to the third embodiment is substantially the same as the thickness (length in the X-axis direction) of the substrate 30. Therefore, as shown in FIG. 9, the edge portion on the vertically upper side of the substrate 30 is firmly engaged with the engaging groove 102a and cannot move in the X-axis direction. In other words, the rib 110a supports the substrate 30 at a contact section 31a.

On the other hand, the width (length in the X-axis direction) of the engaging groove 103a according to the third embodiment is wider than the thickness (length in the X-axis direction) of the substrate 30. Therefore, the edge portion on the vertically lower side of the substrate 30 can move more largely in the X-axis direction compared to that according to the first embodiment.

As shown in FIG. 9, according to the third embodiment, the acceleration sensor 50 is disposed near the edge portion on the vertically lower side of the substrate 30.

Figure 10:
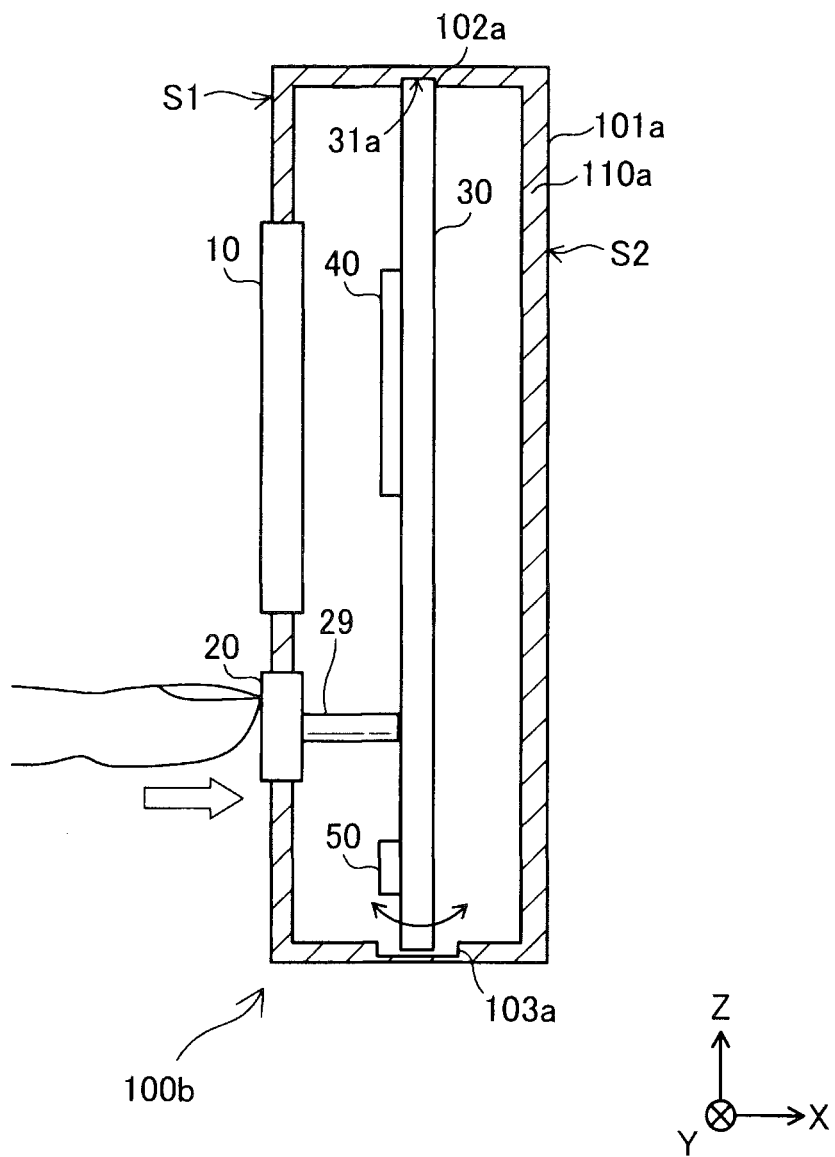
FIG. 10 is an explanatory diagram of an operation of the remote controller performed when the operation input unit receives an operation input according to the third embodiment.

FIG. 10 is an explanatory diagram of an operation of the remote controller 100b performed when the operation input unit 20 receives an operation input according to the third embodiment. The operation performed when the impact of an operation (touch) on the operation input unit 20 is transmitted to the substrate 30 is the same as that according to the first embodiment. Therefore, description thereof is omitted.

When the impact of the operation (touch) on the operation input unit 20 is transmitted to the substrate 30, the substrate 30 rocks with the contact section 31a as the fulcrum (axis). At this time, the edge portion on the vertically lower side of the substrate 30 that is far from the contact section 31a rocks more strongly than other areas of the substrate 30. Therefore, the acceleration sensor 50 detects a strong vibration (acceleration).

The remote controller 100b according to the third embodiment, configured as described above, achieves effects similar to those of the remote controller 100 according to the first embodiment. In addition, the fulcrum (axis) of the rocking of the substrate 30 is the edge portion of the substrate 30. The acceleration sensor 50 is disposed near an edge portion that is far from the edge portion serving as the fulcrum (in other words, the edge portion opposite to the edge portion serving as the fulcrum). Therefore, when the impact is transmitted to the substrate 30, the acceleration sensor 50 can rock more strongly. In addition, the supporting section 80 can be omitted. Therefore, manufacturing costs of the remote controller 100b can be reduced.

D. Fourth Embodiment

Figure 11:
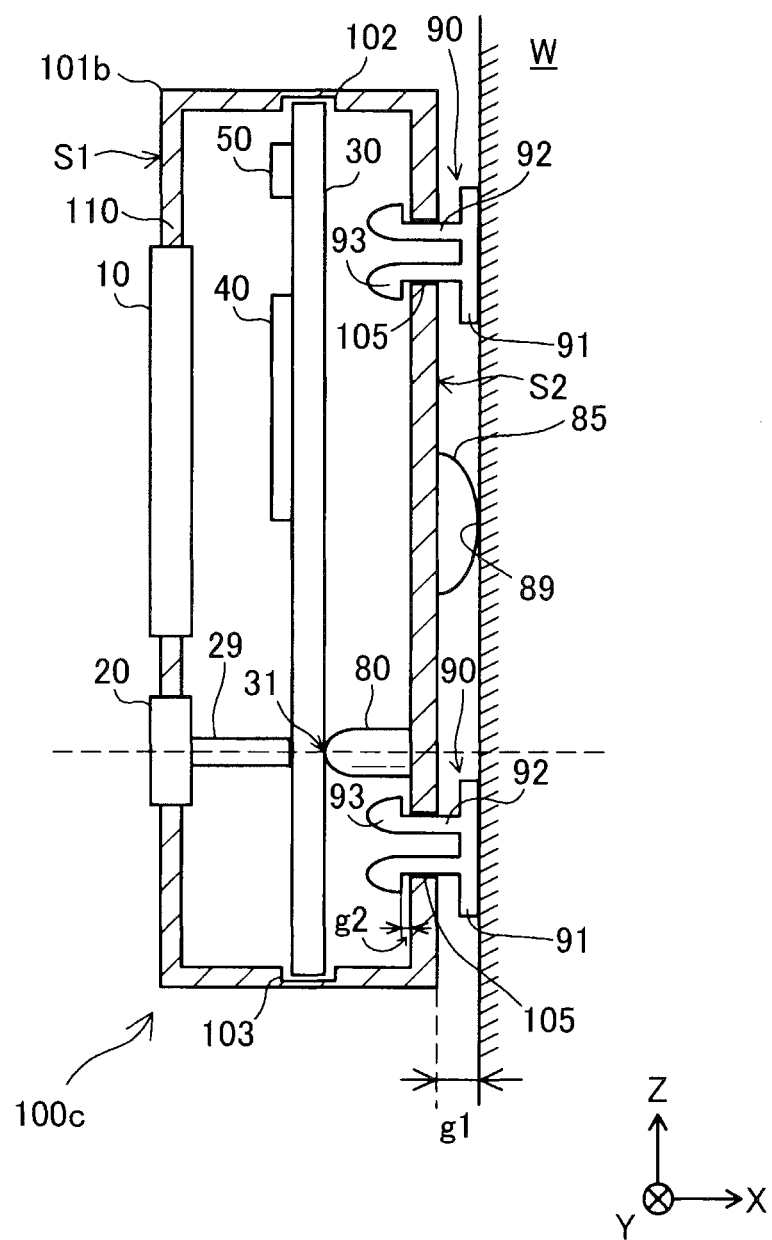
FIG. 11 is a cross-sectional view of a configuration of a remote controller according to a fourth embodiment.

FIG. 11 is a cross-sectional view of a configuration of a remote controller according to a fourth embodiment. FIG. 11 shows a cross-section of a remote controller 100c according to the fourth embodiment, taken along a position similar to that of the cross-section 1-1 in FIG. 1.

The remote controller 100c according to the fourth embodiment differs from the remote controller 100 according to the first embodiment in that a case 101b is provided instead of the case 101, a projecting section 85 is provided, and the remote controller 100c is attached to the wall surface W by attachment fixtures 90 disposed on the wall surface W. In the remote controller 100c according to the fourth embodiment, other configurations are the same as those of the remote controller 100 according to the first embodiment. Therefore, the same constituent elements are given the same reference numbers as those according to the first embodiment. Detailed descriptions thereof are omitted.

As shown in FIG. 11, the case 101b according to the fourth embodiment differs from the case 101 according to the first embodiment in that two engaging holes 105 are provided. The two engaging holes 105 are aligned in the Z-axis direction and provided on the surface S2 opposing the wall W. Other configurations are the same as those of the case 101 according to the first embodiment. The two engaging holes 105 are both through holes that pass through the case 101b in the thickness direction.

The projecting section 85 is disposed in the center portion of the surface S2. The projecting section 85 projects towards the outer side (wall surface W side). The projecting section 85 has a semi-spherical outer appearance shape. In the state shown in FIG. 11, a peak 89 of the projecting section 85 is in contact with the wall surface W. The projecting section 85 projects outward from the surface S2. Therefore, a gap g1 is formed between the surface S2 and the wall surface W. The gap g1 is equivalent to the length in the X-axis direction of the projecting section 85. According to the fourth embodiment, the projecting section 85 is composed of a material similar to that of the supporting section 80.

As shown in FIG. 11, the attachment fixtures 90 are set on the wall surface W in positions corresponding to the engaging holes 105. The attachment fixture 90 includes a supporting portion 91 and a circular cylindrical portion 92.

The supporting portion 91 has a thin, circular disk-like outer appearance shape with a substantially circular planar shape. The supporting portion 91 is joined to the wall surface W. The circular cylindrical portion 92 is joined to the surface of the supporting portion 91 opposite to the surface that is joined to the wall surface W.

The circular cylindrical portion 92 has a substantially circular cylindrical outer appearance shape. The circular cylindrical portion 92 is disposed such as to project in the −X direction from the supporting portion 91. In the circular cylindrical portion 92, a tip portion 93 is formed in the end portion on the side opposite to the side joined to the supporting portion 91. The tip portion 93 has a larger outer diameter than the other areas of the circular cylindrical portion 92. The circular cylindrical portion 92 engages with the engaging hole 105. The tip portion 93 is disposed within the case 101b. The tip portion 93 prevents the attachment fixture 90 from detaching from the engaging hole 105.

As shown in FIG. 11, the combined length of the length of the projecting portion 85 in the X-axis direction and the length of the rib 110 in the X-axis direction is shorter than the length, in the X-axis direction, of the portion of the circular cylindrical portion 92 excluding the tip portion 93. Therefore, as shown in FIG. 11, a gap g2 is formed between the end portion in the +X direction of the tip portion 93 and the surface on the inner side of the case 101b. As a result of the gap g2 being formed in this way, the case 101b (the overall remote controller 100c) can move in the X-axis direction. In addition, because the peak 89 of the projecting section 85 is in contact with the wall surface W, the case 101b (the overall remote controller 100c) can rock with the peak 89 as the fulcrum (axis).

Figure 12:
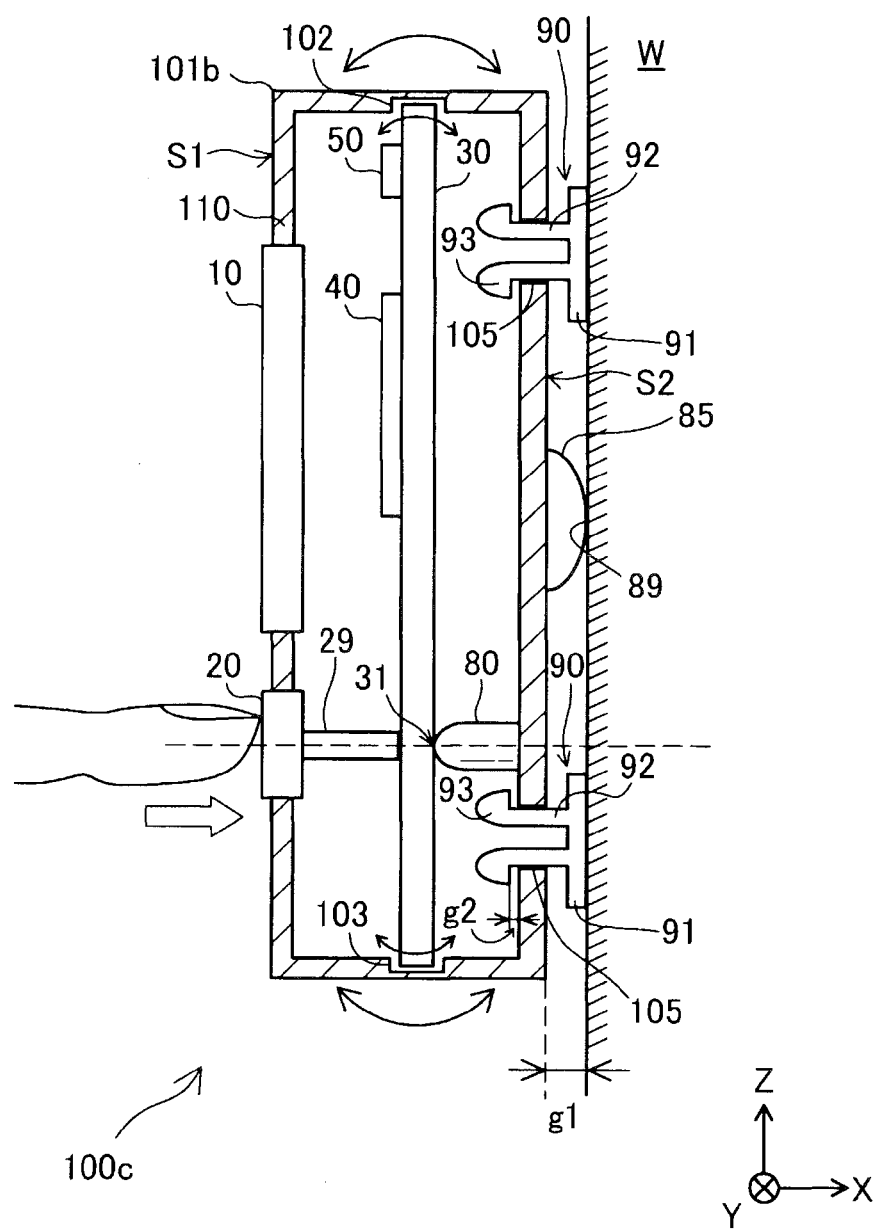
FIG. 12 is an explanatory diagram of an operation of the remote controller when the operation input unit receives an operation input according to a fourth embodiment.

FIG. 12 is an explanatory diagram of an operation of the remote controller 110c when the operation input unit 20 receives an operation input according to the fourth embodiment. The operation performed when the impact of an operation (touch) on the operation input unit 20 is transmitted to the substrate 30 is the same as that according to the first embodiment. Therefore, description thereof is omitted. In addition, the movement (rocking) of the substrate 30 with the contact section 31 as the fulcrum (axis) after the impact is transmitted to the substrate 30 is the same as that according to the first embodiment. Therefore, description thereof is omitted.

As shown in FIG. 12, when the operation input unit 20 receives an operation input, the impact is transmitted to the case 101b. Then, the case 101b itself rocks with the peak 89 as the fulcrum (axis). As a result of the case 101b rocking, the impact is transmitted to the substrate 30 via the supporting section 80. As a result, the substrate 30 rocks more strongly.

The remote controller 100c according to the fourth embodiment, configured as described above, achieves effects similar to those of the remote controller 100 according to the first embodiment. In addition, when the remote controller 100c is attached to the wall surface W using the attaching fixtures 90, the gap g2 is formed between the tip portions 93 of the attachment fixtures 90 and the case 101b. Therefore, the case 101b (the overall remote controller 100c) can be moved in the X-axis direction. In other words, the attachment fixtures 90 engage with the engaging holes 105 such that the case 101b (the overall remote controller 100c) can move in the X-axis direction.

In addition, the remote controller 100c is in contact with the wall surface W only at the peak portion 89 of the projecting section 85. The surface S2 of the remote controller 100c is not in contact with the wall surface W. Therefore, when the operation input unit 20 receives an operation input and the impact is transmitted to the case 101b, the case 101b (the overall remote controller 100c) can be rocked. Therefore, the impact of the rocking can be transmitted to the substrate 30 via the supporting section 80. As a result, the substrate 30 can be rocked more strongly.

E. Variation Examples

E1. First Variation Example

The configurations of the remote controllers 100, 100a, 100b, and 100c according to the embodiments are merely examples. Various modifications are possible.

For example, communication between the air-conditioning apparatus 200 and the remote controllers 100, 100a, 100b, and 100c is wireless communication. However, wired communication may be used instead of wireless communication.

In addition, the power supply unit 60 includes the battery 61. However, the battery 61 may not be provided. In this configuration, power is preferably supplied from an outside source.

In addition, according to the embodiments, the operation input sections 20 and 20a are both touch panels. However, hardware buttons may be used instead of the touch panel. In this configuration as well, detection accuracy of whether or not the hardware button is pressed can be improved.

E2. Second Variation Example

According to the first, second, and fourth embodiment, the position p50 of the acceleration sensor 50 in the Z-axis direction is in the area Ar1. However, the position p50 may be in the area Ar2 instead of the area Ar1. In addition, the sensor 50 may be disposed such that the position p50 is between the position 31 of the contact section 31 and a position in the Z-axis direction of the edge portion 33b on the vertically lower side.

In this configuration, between the position p31 of the contact section 31 and the position in the Z-axis direction of the edge portion 33b, the sensor 50 is preferably disposed on the edge portion 33b side. As a result, the sensor 50 is disposed on the edge portion 33b side that rocks more strongly. Therefore, detection accuracy of the operation input by the sensor 50 can be further improved.

In addition, according to the first, second, and fourth embodiments, the contact section 31 is disposed in a position corresponding in the user touch direction to the operation input sections 20 and 20a. However, instead of this position, the contact section 31 may be disposed in another arbitrary position. In other words, the supporting section 80 may be disposed such that the contact section 31 is disposed in a position differing from the position corresponding in the user touch direction to the operation input sections 20 and 20a.

E3. Third Variation Example

According to the embodiments, the grooves 102, 102a, 103, and 103a are provided in the ribs 110 and 110a to enable movement of the substrate 30 in the X-axis direction. However, the grooves 102, 102a, 103, and 103a may be omitted. In this configuration, to support the substrate 30 such as to be movable in the X-axis direction, for example, the substrate 30 may be supported from the +X direction or the −X direction by an elastic member, such as a spring or a sponge.

E4. Fourth Variation Example

According to the embodiments, the display unit 10 and the operation input sections 20 and 20a are provided separately. However, the display unit 10 and the operation input sections 20 and 20a may be integrated. Specifically, the display unit 10 may be a touch panel. The operation input may be received by the display unit 10. In this configuration, the contact transmitting section 29 is disposed between the display unit 10 and the substrate 30. In this configuration, the contact section is preferably disposed in a position corresponding in the X-axis direction to a position in which an operation button icon is displayed in the display unit 10.

E5. Fifth Variation Example

According to the embodiments, the control unit 40 and the touch detecting unit 45 are both mounted on the substrate 30 that is the same substrate 30 on which the acceleration sensor 50 is mounted. However, the present invention is not limited thereto. At least one of the control unit 40 and the touch detecting unit 45 may be disposed on a substrate other than the substrate 30. In other words, in general, a substrate on which at least the acceleration sensor 50 is disposed can be used as the substrate to which the impact of the operation (touch) on the operation input unit 20 is transmitted.

E6. Sixth Variation Example

According to the embodiments, the contact transmitting sections 29, 29a, and 29b are each in contact with the substrate 30. However, the present invention is not limited thereto. For example, a configuration is possible in which, in a state in which an operation input (touch) is not performed on the operation input sections 20 and 20a, the contact transmitting sections 29, 29a, and 29b are not in contact with the substrate 30. When an operation input is performed, the contact transmitting sections 29, 29a, and 29b may come into contact with the substrate 30 as a result of the impact.

E7. Seventh Variation Example

According to the embodiments, the acceleration sensor 50 is used to detect the vibration of the substrate 30. However, an arbitrary sensor capable of detecting the vibration of the substrate 30 may be used instead of the acceleration sensor 50.

E8. Eighth Variation Example

According to the embodiments, the object to be controlled by the remote controllers 100, 100a, 100b, and 100c is the air-conditioning apparatus 200. However, the present invention is not limited thereto. For example, an arbitrary apparatus, such as a control computer for a home energy management system (HEMS), a lighting apparatus, or a display apparatus such as a television receiver, may be controlled.

The present invention is not limited to the above-described embodiments and variation examples. The present invention may be actualized by various configurations without departing from the spirit of the invention. For example, technical features in the embodiments and variation examples corresponding to technical features in the embodiments described in the Summary of the Invention column can be interchanged and combined accordingly to achieve all or part of the above-described effects, or to solve all or part of the above-described issues. In addition, unless a technical feature is described as being a requisite in the present specification, the technical features may be omitted accordingly.

What is claimed is:

1. A remote controller comprising:
   a case;
   a touch panel that is disposed on an outer surface of the case, the touch panel receives an operation input for controlling a control subject;
   a control unit that transmits, to the control subject, a control signal for controlling the control subject based on the operation input received by the touch panel;
   a substrate that is disposed within the case so as to be movable with respect to the case and, when the touch panel receives the operation input, the substrate comes into contact with the touch panel so that the substrate vibrates with respect to the case due to an impact caused by contact with the touch panel;
   a sensor that is disposed on the substrate, the sensor detects the vibration of the substrate with respect to the case caused by contact with the touch panel, the sensor outputs a detection signal indicating detection of the vibration;
   a touch detecting unit that identifies whether or not the operation input is performed based on the detection signal; and
   a power supply control unit that controls power supplied to the control unit to increase the power supplied when the touch detecting unit identifies that the operation input is performed compared to the power supplied when the touch detecting unit identifies that the operation input is not performed.

2. The remote controller according to claim 1, further comprising:
   a supporting section that comes into contact with the substrate; and
   a contact section of the substrate that comes into contact with the supporting section serving as a fulcrum when the substrate vibrates, wherein
      the substrate has a first edge portion and a second edge portion in a predetermined direction,
      the sensor is disposed in a position on the substrate differing from a position of the contact section such that: (i) a position of the contact section is closer to the first edge portion of the substrate in the predetermined direction between the first edge portion and the second edge portion of the substrate, and (ii) the position of the sensor is closer to the second edge portion of the substrate in the predetermined direction between the position of the contact section and the second edge portion of the substrate.

3. The remote controller according to claim 2, wherein the contact section is disposed in a corresponding position on the substrate, the corresponding position corresponding to a position of an operation input section in an operation input direction in which the operation input is performed.

4. The remote controller according to claim 3, wherein the sensor is disposed on an edge portion side of the substrate between the contact section and the second edge portion of the substrate.

5. The remote controller according to claim 4, wherein the touch panel includes a plurality of sub operation input units that are disposed away from each other, the corresponding position being a position on the substrate corresponding to a central position between the plurality of sub operation input units in an operation input direction in which an operation input of each of the sub operation input units is performed.

6. The remote controller according to claim 5, wherein:
   the case has a rib in an edge portion of the case;
   the supporting section is configured as a part of the rib; and
   portions of the rib other than the supporting section are not in contact with the substrate in a state in which the touch panel is not receiving the operation input.

7. The remote controller according to claim 6, further comprising:
   an attaching section that attaches the remote controller to a surface on which an attachment fixture is mounted, the attaching section engaging with the attachment fixture such that the remote controller is movable in the operation input direction; and
   a projecting section that is disposed on an opposing surface of the case that opposes the surface in a state in which the remote controller is attached to the surface, and the projecting section comes into contact with the surface when the touch panel receives the operation input.

8. The remote controller according to claim 7, wherein the operation input includes a touch panel.

9. The remote controller according to claim 8, further comprising a battery that supplies power.

10. The remote controller according to claim 3, wherein the touch panel includes s a plurality of sub operation input units that are disposed away from each other, the corresponding position being a position on the substrate corresponding to a central position between the plurality of sub operation input units in an operation input direction in which an operation input of each of the sub operation input units is performed.

11. The remote controller according to claim 2, wherein:
   the case has a rib in an edge portion of the case;
   the supporting section is configured as a part of the rib; and
   portions of the rib other than the supporting section are not in contact with the substrate in a state in which the touch panel is not receiving the operation input.

12. The remote controller according to claim 1, further comprising:
   an attaching section that attaches the remote controller to a surface on which an attachment fixture is mounted, the attaching section engaging with the attachment fixture such that the remote controller is movable in the operation input direction; and
   a projecting section that is disposed on an opposing surface of the case that opposes the surface in a state in which the remote controller is attached to the surface, and the projecting section comes into contact with the surface when the touch panel receives the operation input.

13. The remote controller according to claim 1, further comprising a battery that supplies the power.

14. The remote controller according to claim 13, wherein the power supply control unit is configured to perform a process to switch an operation mode between a normal mode and a power saving mode;
- in the normal mode, the power is supplied from the battery to the touch panel, the control unit, and the touch detecting unit; and
- in the power saving mode, the power is supplied from the battery to the touch detecting unit;
- the operation mode being switched from the normal mode to the power saving mode when identified that the operation input is not performed for a predetermined period; and
- the operation mode being switched from the power saving mode to the normal mode when identified that the operation input is performed.

15. The remote controller according to claim 1, wherein the sensor includes an acceleration sensor.

16. The remote controller according to claim 1, wherein the control subject includes an air-conditioning apparatus.

* * * * *